United States Patent [19]

Schlachter et al.

[11] 4,155,732
[45] May 22, 1979

[54] SPINNERETTE FOR MAKING GLASS FIBERS

[75] Inventors: Fredo Schlachter, Johannesburg; Heinz Keib; Dieter Kahnke, both of Wertheim; Christian Beck, Hasloch, all of Fed. Rep. of Germany

[73] Assignee: Glaswerk Schuller GmbH, Wertheim, Fed. Rep. of Germany

[21] Appl. No.: 906,844

[22] Filed: May 15, 1978

[30] Foreign Application Priority Data

May 14, 1977 [DE] Fed. Rep. of Germany ....... 2721954
Mar. 17, 1978 [DE] Fed. Rep. of Germany ....... 2811618

[51] Int. Cl.² .............................................. C03B 37/02
[52] U.S. Cl. ........................................ 65/1; 65/11 W; 65/374 M; 425/72 S
[58] Field of Search ................. 65/1, 2, 11 W, 374 M; 13/6; 425/72 S

[56] References Cited

U.S. PATENT DOCUMENTS

| 2,383,168 | 8/1945 | Slayter ................... 65/1 X |
| 3,401,536 | 9/1968 | Glaser ........................ 65/1 |
| 3,573,014 | 3/1971 | Strickland et al. ............. 65/11 W X |
| 3,574,581 | 4/1971 | Strickland et al. ............. 65/11 W X |
| 3,920,429 | 11/1975 | Stalego ..................... 65/1 |

Primary Examiner—Robert L. Lindsay, Jr.
Attorney, Agent, or Firm—Michael J. Striker

[57] ABSTRACT

A spinnerette has an extrusion crucible provided with extrusion nozzles in its bottom wall, and a melting crucible atop the extrusion crucible. The melting crucible is bounded in longitudinal direction by walls having arcuately curved wall segments so that the interior of the melting crucible is composed of a plurality of generally cylindrical compartments which are arranged side by side in the longitudinal direction and which open into one another where they adjoin each other.

9 Claims, 5 Drawing Figures

SPINNERETTE FOR MAKING GLASS FIBERS

BACKGROUND OF THE INVENTION

1. Field of the Invention

This invention relates generally to the manufacture of fibers or filaments from thermosplastic materials, including vitrous thermoplastic materials such as glass.

More particularly, the invention relates to a spinnerette for making such fibers.

2. The Prior Art

Filaments of thermoplastic material, such as e.g. glass, are produced by maintaining a supply of the molten thermoplastic material in an extrusion crucible the bottom wall of which is provided with nozzles through which the molten material extrudes to form filaments. These are drawn off, for example by contact with a drawing drum rotating at high speed.

To permit continuous high-speed production of the filaments the extrusion crucible must be continuously supplied with additional molten thermoplastic material. For this purpose it is known to mount atop the extrusion crucible a melting crucible which forms part of the spinnerette and into which thermoplastic material is admitted in solid state, to become melted therein and to pass as a melt through openings in a dividing wall into the extrusion crucible. Clarification and homogenization of the melt takes place in the extrusion crucible as the newly admitted melt descends therein towards the nozzles in the bottom wall.

As the melt extrudes through the nozzles it turns to filaments which are drawn off by a suitable device, for example a drawing drum of the type disclosed in U.S. Pat. No. 3,676,096. The solidified filaments may be combined to form strands, or they may be severed to form fibers of desired length.

One way of feeding additional bodies of thermoplastic material to the melting crucible is disclosed in U.S. Pat. No. 3,489,542. There, spheres of glass are supplied along individual inclined paths into pre-melt chambers each of which can accommodate only one sphere at a time. In these chambers, which are located adjacent one another over the length of the melting crucible and which communicate with the same via restricted orifices, the spheres are preheated by radiation from the melting crucible until they soften and melt so that their material can pass through the orifices and drip into the melting crucible to unite with the contents of the same and form therewith a uniform melt.

The equipment required for this type of arrangement is necessarily rather complicated and expensive. Moreover, the bodies being fed must be of identical size to avoid malfunctions. If a malfunction does occur in the movement of such bodies along one of the paths, so that the supply to one of the pre-melt chambers (and hence to a portion of the melting crucible) is interrupted, this causes in that particular portion of the melting crucible a supply condition and a melt viscosity condition which differ from those prevailing in the other portions of the crucible; this influences the uniformity of the spinning (extruding) operation.

According to the disclosure of U.S. Pat. No. 3,615,314 the melting crucible which receives the solid thermoplastic material is not mounted directly atop the extrusion crucible, but is mounted in the sidewalls of the same which are upwardly extended for this purpose. The melting crucible is of triangular cross-section, with one corner of the triangle facing downwardly towards the spinnerette wall having the extrusion nozzles. Over its length the melting crucible is subdivided into a plurality of chambers which communicate with one another only in the region of the downwardly facing corner. Every other one of these chambers has an opening by which it communicates with the extrusion crucible; the remaining chambers have no such openings and receive the solid thermoplastic bodies to be melted.

Both of the two patents just discussed require uniformly dimensioned spheres or similar bodies for feeding of their melting crucibles. They cannot use supply bodies in form of pellets which are much easier to make (and hence less expensive) than the uniformly dimensioned bodies, but which are also much less uniform in size and shape. Such pellets are employed in German Published Application DE-OS No. 2,326,975 where they are dropped from above into the melting crucible by an inclined chute which moves back and forth over the length of the crucible.

All three aforementioned disclosures have in common that the melting crucible is not fed with solid supply bodies continuously and over its entire length or at least over a substantial continuous portion of its length. This means that the cold (or at least relatively cold) material of the supply bodies enters into the hot melt in the melting crucible at a plurality of locations which are spaced from one another lengthwise of the melting crucible. This in effect cools the melt at these locations whereas at the areas between these locations the melt is considerably hotter. Due to the communication of the melting crucible with the extrusion crucible, these same conditions will also prevail in the extrusion crucible so that the uniformity of melt temperature and melt viscosity which is required to obtain uniform spinning of the filaments, is lacking.

The temperature variations at the different melt crucible locations also cause non-uniform stressing of the crucible material which leads, particularly in areas subject to overheating, to a reduction of the spinnerette lifetime.

To assure proper spinning conditions it is necessary that the temperature of the melt in the crucibles (i.e., the melting crucible and the extrusion crucible) be as uniform as possible over the length of these crucibles. This is possible only if the interior of the melting crucible is not subdivided into chambers which, as in the current practice, either do not communicate with one another (and communicate only with the extrusion crucible), or which communicate with one another only via relatively small openings of restricted cross-section. Also, localized admission of supply bodies into the melt must be avoided if uniform melt temperature is to be obtained over the length of the melting crucible.

Still a further problem which is encountered in the type of equipment under discussion, is the fact that spinnerettes must be made of platinum or of a platinum alloy. Such spinnerettes are relatively long in direction lengthwise of their crucibles and relatively narrow in their width; a typical example is a length of 900 mm and a width of 70 mm, not including the refractory material in which the spinnerette is mounted. Because of the high cost of platinum or platinum alloys the spinnerette walls are made very thin, usually having a thickness less than 1 mm. Due to the high temperature fluctuations which occur in the operation of this equipment (i.e., at start-up and at shut-down), these walls are subject to quite extreme stresses. This presents a serious problem, because the walls are made so thin to reduce the amount of expensive platinum or platinum alloy that is required, whereas on the other hand such thin walls often prove to be insufficiently resistant to deformation resulting from the thermal stresses. Thus, it may (and does) happen that during shut-down (i.e., cooling-off) the walls buckle inwardly towards one another; this changes the volumetric content of the crucible, may lead to the formation of cracks or fissures and causes difficulties in the admission of supply bodies.

Of course, deformation resistance of the walls can be increased by providing cross-braces, as for example disclosed in U.S. Pat. No. 3,056,846. However, this proposal leads to the use of additional expensive platinum or platinum alloy and such cross-braces tend to obstruct the free flow of the melt.

SUMMARY OF THE INVENTION

It is, accordingly, an object of the present invention to overcome the disadvantages of the prior art.

More particularly, it is an object of the invention to provide an improved spinnerette which is not possessed of these disadvantages.

Another object is to provide such a spinnerette which is sufficiently deformation resistant under all operating conditions and requires for its construction only a relatively small amount of material (e.g., platinum or platinum alloy).

A concomitant object is to provide a spinnerette which permits the uniform infeeding of supply bodies over its entire length and wherein melt temperatures can be maintained which are also uniform over the entire spinnerette length.

In pursuance of these objects, and of still others which will become apparent hereinafter, one feature of the invention resides in a spinnerette which, briefly stated, may comprise an elongated extrusion crucible having a bottom wall provided with a plurality of nozzles for extrusion of molten thermoplastic material, and an elongated melting crucible of electrically conductive material atop and communicating with the extrusion crucible and adapted to receive bodies of thermoplastic material for conversion into a thermoplastic melt, the melting crucible having a pair of opposite upstanding sidewalls each composed of a plurality of arcuate sections, oppositely located sections together bounding respective chambers of substantially cylindrical cross-section and adjoining areas of the chambers merging into one another so that the melting crucible has a continuous interior space over its entire length.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
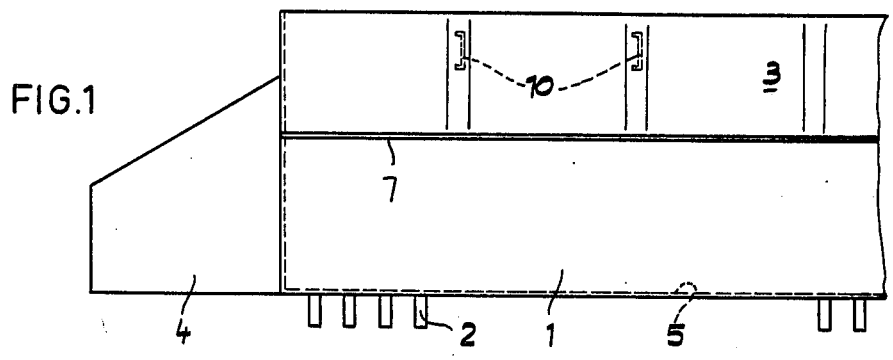
FIG. 1 is a fragmentary, somewhat diagrammatic side view of a spinnerette according to the invention.
Figure 2:
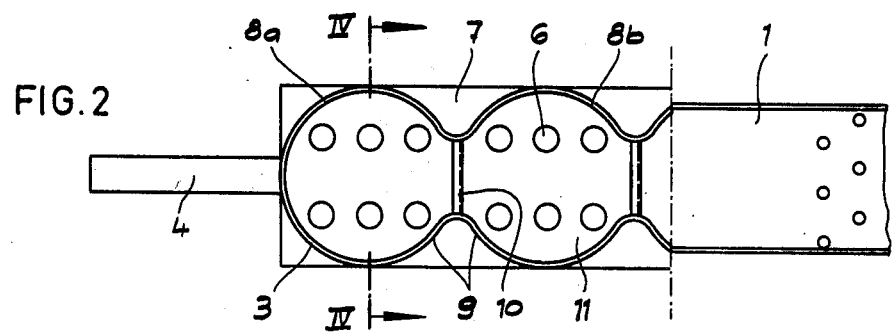
FIG. 2 is a top plan view of the spinnerette in FIG. 1, with portions of the melting crucible omitted for clarity.

One embodiment of the invention is illustrated in FIGS. 1 and 2. It is noted that the refractory material in which spinnerettes are conventionally embedded is not illustrated in these or in any of the other Figures, because it is not germane to the invention.

The spinnerette in FIGS. 1 and 2 consists, as do all currently known spinnerettes, of an extrusion crucible 1 the bottom wall 5 of which is apertured and provided with extrusion nozzles or spinning jets 2. Mounted on top of this extrusion crucible is the melting crucible 3 into the interior of which the supply bodies of thermoplastic material (e.g., glass pellets) are introduced to become melted. A wall 7 (e.g., the bottom wall of crucible 3) separates the crucibles 3 and 2 from one another; it is provided with apertures 6 (FIG. 2) through which melt can flow from crucible 3 into crucible 2.

Spinnerettes are usually heated by an electric resistance heating circuit; this has not been shown herein, but FIG. 1 illustrates one of the two conductor plates (analogous to bus-bars) by means of which the spinnerette is to be connected to the heating circuit.

In accordance with the present invention the sidewalls of the crucible 3 in FIGS. 1 and 2 are composed of a plurality of arcuate sections 8a, 8b which in this embodiment bound a series (as seen in longitudinal direction of the crucible 3) of circular cylindrical chambers. Where the successive chambers meet they open into one another, as shown in FIG. 2. At these areas of communication the crucible may be provided, for further stiffening, with cross-braces 10 which, however, have only a small height and are preferably located only in the upper region of the crucible 3. These braces 10 extend transverse to the direction of the elongation of the crucible 3 and connect the transversely opposite wall portions 9 with one another.

Thus, by the shape of the crucible 3 may also be described by saying that the lateral sides of the crucible 3 are bounded by parallel vertical lines which coincide at the sidewall portions 8a and 8b with the generatrices of cylinders of circular cross-section whose central axes in turn coincide with the vertical longitudinal center plane of the crucible 3. These cylinders merge via the regions bounded by the wall portions 9 into the generatrices of smaller, oppositely curved cylinders whose central axes are located in a plane which intersects the junction of two adjacent portions 8a, 8b at right angles to the longitudinal center plane of the crucible 3.

This configuration has a number of important advantages. It produces a melting-crucible interior 11 which is uninterrupted from end-to-end of the crucible so that separate chambers are eliminated. This makes it possible to assure that the melt in the crucible 3 can be maintained at uniform temperature over the entire length of the interior 11; it also facilitates the uniform admission of supply bodies (from above) into the interior 11 over the entire length of the same. Furthermore, the fact that successive sections of the crucible 3 are of essentially tubular-shape cross-section and are braced over at least part of their height by the braces 10, results in a greatly improved deformation resistance of the sidewalls of the crucible 3. This prevents a contraction of the opposite sidewalls in direction towards one another by the melt in case of substantial temperature fluctuations, and counteracts the formation of cracks.

The melt temperature is to a large extent a function of the length of the sidewalls of the spinnerette, since it is these electrically conductive sidewalls which are resistance heated. By varying the length of the sidewalls in relation to the overall length of the spinnerette it is therefore possible to vary the electrical resistance offered by the sidewalls and thus to influence the heating effect obtained.

Figure 3:
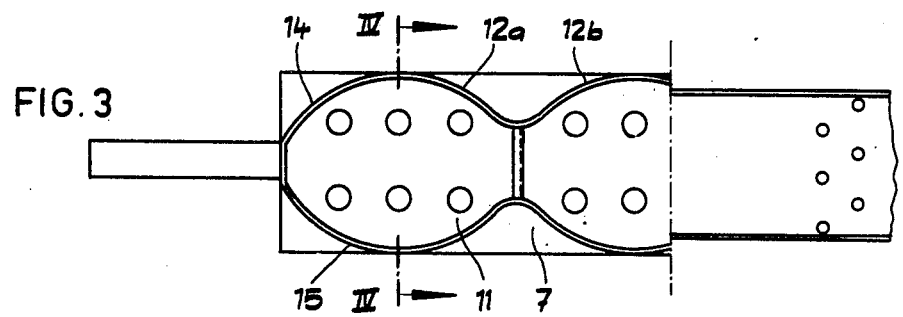
FIG. 3 is a view similar to FIG. 2, but illustrating a different embodiment.

FIG. 3, which in all other respects is the same as FIGS. 1 and 2, illustrates how this may be accomplished by having the sidewall portions 12a, 12b curved in such a manner that the cross-section of the spaces which they bound is oval or elliptical, so that the wall portions 14 and 15 have radii which differ from those of the wall portions 9 (FIGS. 1 and 2) and whose central axes need not be located in the longitudinal center plane of the crucible 3. So constructed, the developed length of each sidewall will be different from the developed length of the comparable sidewall in FIGS. 1 and 2, and in consequence the larger sidewalls will offer greater resistance to the heating current.

Figure 4:
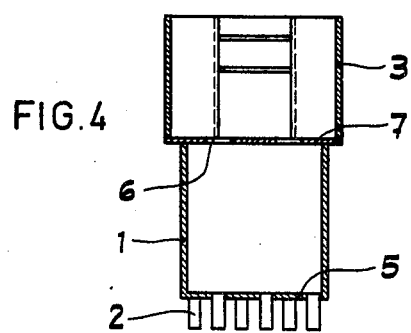
FIG. 4 is a vertical section on line IV—IV of FIG. 2 or FIG. 3.

FIG. 4 is a cross-section which may be on the line IV—IV of either FIG. 2 or FIG. 3. The appearance will be no different in either case.

Figure 5:
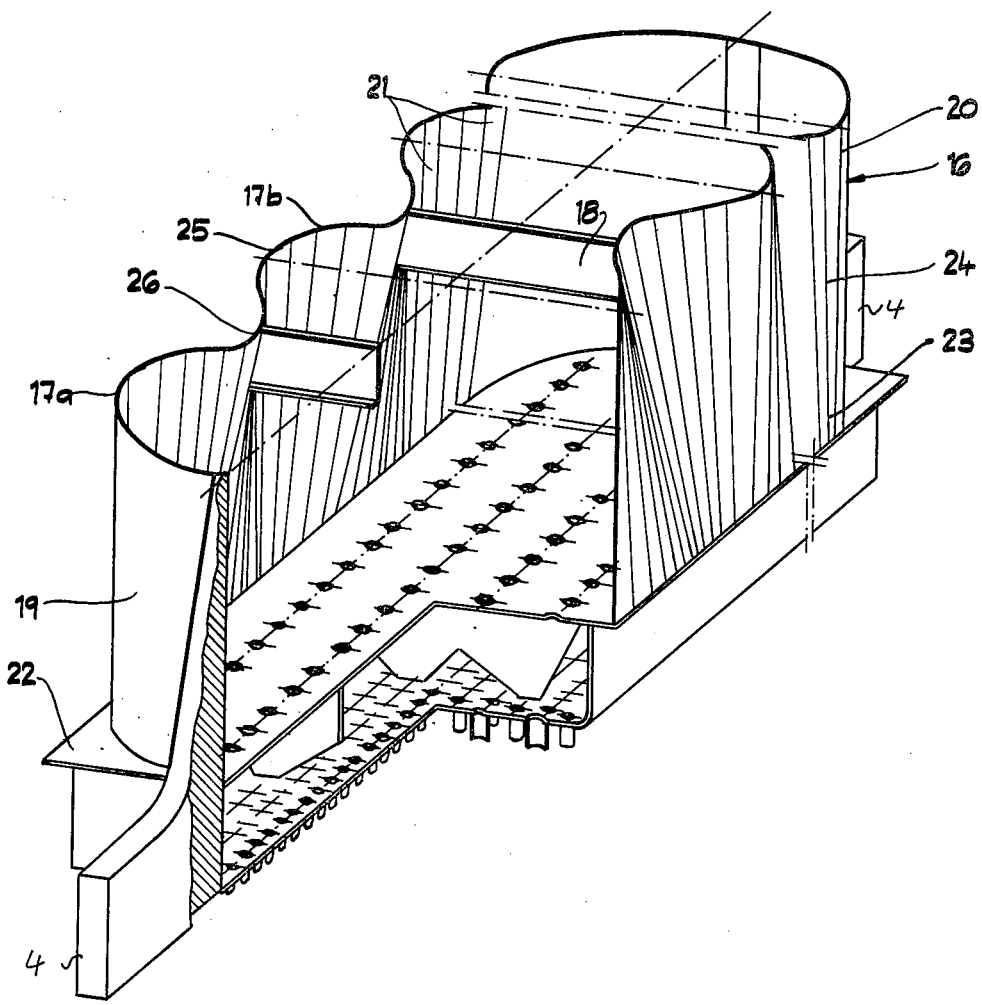
FIG. 5 is a fragmentary, partly sectioned perspective view showing an additional embodiment of the invention.

A further embodiment of the invention is shown in FIG. 5. A particular advantage of this embodiment is that the melting heat, which is primarily produced by resistance heating of the melting crucible sidewalls, can be varied over the height of the melting crucible, in such a manner that it is less in the upper crucible region (e.g., about 950° C.) and more (e.g., about 1150° C.) in the lower crucible region closer to the wall which separates the melting crucible from the extrusion crucible. In the lower region the thermoplastic melt is already to be largely refined, i.e., melted down to its extrusion viscosity.

In FIG. 5 the sidewalls of the melting crucible 16 are composed of cylinder sections 17a, 17b which, as before, define in the interior of the crucible a plurality of substantially cylindrical chambers, adjacent ones of which are open to each other at their juncture. Crossbraces 18 of relatively small height connect the opposite side walls to one another.

Unlike the preceding embodiments the sidewalls in FIG. 5 have different shapes in their upper regions than in their lower regions. In the upper regions 20 the sidewalls are of arcuate shape, so that they form a curve 21 in the longitudinal direction of the melting crucible. In their lower regions 23 adjacent the wall 22 which separates the melting crucible from the extrusion crucible, the sidewalls are completely planar, i.e., not curved at all. Intermediate the regions 20 and 23 there is a transition region 24 in which the arcuate curvatures of region 20 merge gradually into the straight line of region 23.

This may be stated another way, by saying that the lateral crucible sides are bounded by parallel adjacent lines which coincide in the portion 25 of curve 21 with the vertical generatrices of circular cross-section cylinders, and which diverge from there in opposite directions to the adjacent portions 26 of the curve 21 to become the generatrices of inverted circular cross-section cones whose central axes are located in planes extending normal to the vertical longitudinal center plane of the crucible.

It will be evident that the developed length of each sidewall will be greater in the region 20 (by, e.g., 15-30%) than in the region 23 of the same sidewall, and that the transition from the greater to the shorter length is gradual. Correspondingly, the electrical resistance of the conductive sidewalls will be highest in the region 20 and will gradually decrease via the region 24 to its lowest value which is found in the region 23. This means that when a current is applied to the sidewalls of the melting crucible, each sidewall will heat up in the region 20 only to a lesser extent than in the region 23, so that there will be a corresponding differential in the heat-exchange between these sidewall regions and the melt located opposite them.

The embodiment of FIG. 5 thus continues to offer the advantages of those in FIGS. 1–4, including the important resistance to sidewall deformation, but at the same time also allows a saving of electrical energy. Evidently, this embodiment (and analogous variations of it) makes it possible to predetermine to what part of the melt (i.e., as considered in the direction between the top and the bottom of the melting crucible) greater or lesser heat is to be transmitted. Thus, if the upper region 20 of a sidewall is strongly curved, the sidewall will offer greater resistance and consequently produce less heat than if it were less strongly curved, as for example shown in FIG. 3. Moreover, the degree of such curvature may be varied over the length of the crucible sidewalls; for example, the mid-region of the sidewalls (as evidenced in direction from one to the other end of the crucible) may have radii of curvature which are greater or smaller than those at one or both of the end regions, or vice versa, depending upon the heating of the melt is to be controlled.

While the invention has been illustrated and described as embodied in a spinnerette, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A spinnerette for producing filaments from thermoplastic material, comprising an elongated extrusion crucible having a bottom wall provided with a plurality of nozzles for extrusion of molten thermoplastic material; and an elongated melting crucible of electrically conductive material atop and communicating with said extrusion crucible and adapted to receive bodies of thermoplastic material for conversion into a thermoplastic melt, said melting crucible having a pair of opposite upstanding sidewalls each composed of a plurality of arcuate sections oppositely, located sections together bounding respective chambers of substantially cylindrical cross-section and adjoining ones of said chambers merging into one another so that the melting crucible has a continuous interior space over its entire length.

2. A spinnerette as defined in claim 1; and further comprising brace members connecting said sidewalls in the region where adjoining ones of said chambers merge into one another.

3. A spinnerette as defined in claim 2, said sidewalls each having an upper edge and a lower edge, and said brace members each extending only over part of the distance between said edges.

4. A spinnerette as defined in claim 3, wherein said brace members are provided in the region of said upper edges.

5. A spinnerette as defined in claim 1, wherein said chambers are of circular cross-section except in the regions where they merge into one another.

6. A spinnerette as defined in claim 1, wherein said chambers are of oval cross-section except in the regions where they merge into one another.

7. A spinnerette as defined in claim 1, wherein said chambers are of elliptical cross-section except in the regions where they merge with one another.

8. A spinnerette as defined in claim 1, wherein said sidewalls each have an upper portion and a lower portion and are provided with said arcuate sections only in the region of said upper portion but are planar in the region of said lower portion.

9. A spinnerette as defined in claim 1, wherein said sidewalls each have an upper portion and a lower portion, at least one of said portions being provided with said arcuate section, and the developed length of a first one of said portions being greater than the developed length of a second one of said portions so that said first portion offers greater resistance to the flow of electrical current than said second portion.

* * * * *